United States Patent
Uno et al.

(10) Patent No.: US 7,677,786 B2
(45) Date of Patent: Mar. 16, 2010

(54) METHOD FOR PRODUCING CONCRETE AND STANDARDIZING SYSTEM FOR CONCRETE PRODUCTION

(75) Inventors: Shinji Uno, Matsudo (JP); Haruyo Uno, Matsudo (JP)

(73) Assignee: Yugen Kaisha Sanblen, Matsudo (JP)

( * ) Notice: Subject to any disclaimer, the term of this patent is extended or adjusted under 35 U.S.C. 154(b) by 1120 days.

(21) Appl. No.: 11/312,256

(22) Filed: Dec. 20, 2005

(65) Prior Publication Data

US 2007/0019498 A1    Jan. 25, 2007

(30) Foreign Application Priority Data

Dec. 24, 2004    (JP) .............................. 2004-374026

(51) Int. Cl.
*B28C 7/04*    (2006.01)

(52) U.S. Cl. ........................... 366/8; 106/705; 106/707; 106/709; 106/710; 106/714

(58) Field of Classification Search ................ 106/705, 106/707, 709, 710, 714; 366/2, 6, 8
See application file for complete search history.

(56) References Cited

U.S. PATENT DOCUMENTS

| | | | |
|---|---|---|---|
| 4,990,390 A * | 2/1991 | Kawasaki et al. | 428/113 |
| 5,286,425 A * | 2/1994 | Babcock et al. | 264/31 |
| 5,407,299 A * | 4/1995 | Sutton | 404/75 |
| 2002/0033119 A1* | 3/2002 | Styron | 106/705 |

(Continued)

FOREIGN PATENT DOCUMENTS

JP    10 100117    4/1998

OTHER PUBLICATIONS

Dobokugakkai 2002nen Seitei Konkurito Hyojun Shinhosho (Concrete Standard Specifications, established in 2002 by JSCE), pp. 292-293 "Production and Construction".

(Continued)

*Primary Examiner*—David L Sorkin
(74) *Attorney, Agent, or Firm*—The Webb Law Firm, P.C.

(57) ABSTRACT

There is provided a process for producing concrete, comprising: in producing concrete, previously providing at least one premix composition for a concrete mix, which has been measured and prepared by automatic control means according to properties required of the concrete; and kneading and mixing the previously provided premix composition for a concrete mix with cement, coarse aggregate, fine aggregates, and water. There is also provided a standardizing system for concrete production, characterized by comprising: measuring constituents of a premix composition for a concrete mix with an automatic control device; mixing these constituents together essentially without through human power to prepare a premix composition for a concrete mix according to properties required of the concrete; storing the premix composition; measuring the mass of a slurry composition of the premix composition with an automatic control device essentially without through human power; and kneading and mixing the slurry composition with cement, coarse aggregate, water, and a chemical admixture. There is further provided a standardizing system for concrete production in a concrete production plant, comprising kneading and mixing the above slurry composition of the premix composition with cement, coarse aggregate, fine aggregate and water in the concrete production plant.

Concrete satisfying designed and planned property requirements can be provided in an easy and stable manner.

6 Claims, 3 Drawing Sheets

U.S. PATENT DOCUMENTS

2002/0129743 A1* 9/2002 Frailey et al. ............... 106/705

OTHER PUBLICATIONS

Nihonkenchikugakkai Koryudo Konkurito No Zairyo, Chogo, Seizo, Seko Shishin (Guideline for Material, Blending, Production, and Construction of High-Flow Concrete, established in 1997 by Architechtural Institute of Japan), p. 94.

JIS A 5308 Ready Mixed Concrete, 8.2.1. Measuring method b (revised Dec. 20, 2003; published by Japanese Standards Association), p. 5.

* cited by examiner

METHOD FOR PRODUCING CONCRETE AND STANDARDIZING SYSTEM FOR CONCRETE PRODUCTION

TECHNICAL FIELD

The present invention relates to a process for producing concrete using a predetermined premix composition for a concrete mix, and a standardizing system for multifunctional concrete production.

BACKGROUND ART

Concrete has hitherto been produced by kneading and mixing cement, aggregate, water, and a chemical admixture. Various admixtures have been mixed from the viewpoint of improving properties of cement, properties during kneading and mixing and placing, and various properties after hardening.

In the production of concrete, the mixing ratio among cement, aggregate, an admixture, water and the like sometimes affects workability, for example, in kneading and mixing during concrete production and in concrete placing, and strength, durability, and appearance of concrete after hardening and thus should be carefully determined by taking into consideration also economical efficiency and the like. Further, the order and timing of introduction of these various mixing materials also sometimes affect workability, strength of concrete after hardening and the like. Accordingly, the order and timing of mixing material introduction should also be carefully determined.

In some cases, concrete is produced in concrete production plants so as to be suitable for mass production, and, in another cases, is produced in an actual concrete construction site. Further, the fluidity of concrete produced in a concrete production plant is improved in a concrete construction site.

In general, in introducing a powdery admixture into concrete, a method is sometimes adopted in which a temporary simple plant is installed. This case, however, is rare, and it is common practice to use a method in which an admixture introduction port is provided near a cement discharge gate, and the admixture is hand-introduced at proper timing depending upon the discharge of cement. In this case, introduction work is controlled by instructing unbagging of the admixture and introduction timing by an operating room using, for example, a buzzer or an indicating lamp.

For example, the following documents describe representative techniques concerning concrete production.

(I) "Dobokugakkai 2002nen Seitei Konkurito Hyojun Shihosho (Concrete Standard Specifications, established in 2002 by JSCE" pp. 292-293 "Production and Construction"

""In general, preferably, an expanding material is introduced simultaneously with the introduction of cement. When the expanding material is introduced together with other materials or solely, it should be previously confirmed by a test that the expanding material can be kneaded and mixed satisfactorily and homogeneously. If the introduction timing is different from the planned one, a proper step such as prolonging of the kneading and mixing time should be taken. When lumps and the like are formed by the deposition of the expanding material onto a mixer, lump debris is mixed in the concrete, leading to a fear of causing partial breaking. Accordingly, upon the formation of lumps of the expanding material, they should be immediately removed.""

(II) "Nihonkenchikugakkai Koryudo Konkurito No Zairyo, Chogo, Seizo, Seko Shishin (Guideline for Material, Blending, Production, and Construction of High-Flow Concrete, established by Architechtural Institute of Japan)" p. 94

""In particular, regarding measuring capability for powder and admixtures not used in the production of JIS products, especially the capability of measuring and introduction which rely upon human power, sufficient care should be taken so as to avoid undervaluation. Further, in many cases, the kneading/mixing time in the mixer should be twice or three times or more larger than that required of JIS products, that is, 60 to 180 sec. It should be kept in mind that, when the kneading/mixing time is twice or three times, the production capacity of the mixer is lowered to one half to one third.""

(III) "JIS A 5308 Ready Mixed Concrete, 8.2.1. Measuring method b."

""Measuring of cement, aggregate, and admixture is carried out in terms of mass. The admixture, however, may be measured in terms of the number of bags if the purchaser approves it. When the amount is below one bag, however, measuring should be carried out in terms of mass.""

DISCLOSURE OF THE INVENTION

Problems to be Solved by the Invention

Regarding the technique (I), the operating room and the measuring room (admixture introduction port) are structurally blinded from each other. Therefore, difficulties are encountered in confirming an introduction timing difference. Even though the timing difference could be successfully confirmed, there is no instruction manual for coping with the timing difference, that is, an manual which describes the relationship between the difference in planned introducing timing and the length of time to be prolonged. Further, it should be noted that both expanding material lumps and coarse aggregates in concrete are substantially identical to each other in color and gray, and, further, the expanding material lumps cannot be distinguished from the aggregates through a monitor television without considerable difficulties. In addition, because of the mixer structure, there is no port for taking out lumps from the upper part of the mixer, and, thus, the removal of the lumps is nearly impossible.

Regarding the technique (II), when measuring and introduction work are carried out through human power, the following problems are posed.

1) In ready mixed concrete plants, in general, concrete of multi-type and multi-mixing is produced by kneading and mixing before shipment. Since shipment of human-power introduced concrete arrives in order therebetween, there is a fear of causing human errors such as misindication from an operating room to a person in charge of introduction, forgetting of introduction by a person in charge of introduction, over-introduction, and under-introduction, introduction timing variation.

2) There is no standard for the ability of the person in charge of introduction, that is, there is a case where a worker in charge is in lack of experience, for example, a part time worker who works only that same day.

3) When powder usually not used in the production of JIS products is introduced, the kneading/mixing time should be twice or three times that of the JIS products, that is, the production efficiency per hr is lowered to one half to one third. As a result, the electric power energy consumption is increased, and the shipment capacity is significantly lowered, that is, the production is inefficient.

In the technique (III), when the amount is below one bag and thus is measured in terms of mass, the amount of scattering of fines produced by the measuring work is several times larger than that produced by measuring in terms of the number of bags. Further, the identification of mixing of the designed admixture corresponding to the required properties is difficult.

In general, in the measuring room, a worker in change of measuring wears a dust mask for work. Work in an environment where fines are scattered has a fear of adversely affecting the human body, for example, causing pneumoconiosis. Further, the work involves a carrying task of heavies, and this fact leads to a lack of expert worker in charge of introduction and difficulties of human resource development.

In recent years, an increasing demand for an enhancement in properties of concrete has led to a demand for the development of various types of concrete satisfying requirements for respective applications, that is, the development of high performance concrete for improving a specific function, and multifunctional concrete which can simultaneously satisfy various performance requirements. In stably producing these high performance concrete and multifunctional concrete, the selection of mixing materials, mixing ratio, and mixing state and the like should be closely controlled depending upon properties required of concrete. As described above, however, the transfer, measuring, mixing and the like of mixing materials for concrete are not always easy, and, thus, high performance concrete and multifunctional concrete satisfying performance requirements cannot be stably supplied without difficulties.

Means for Solving the Problems

An object of the present invention is to solve the above problems of the prior art and to provide a process for producing concrete and a standardizing system for multifunctional concrete production that, by previously providing a premix composition for a concrete mix which has been measured and prepared with automatic control means according to properties required of concrete, 1) can produce concrete which can satisfy a designed and planned single performance requirement and a plurality of performance requirements (multifunction), 2) can record measuring data using an automatic control unit and can enhance measuring accuracy for realizing product guarantee, 3) can significantly shorten the kneading and mixing time and thus can contribute to an increased production capacity, can reduce power consumption, and can reduce energy cost, and 4) can realize the installation of a plurality of storage tanks and thus can store and control multifunctional mixtures.

Thus, according to the present invention, there is provided a process for producing concrete, comprising: in producing concrete, previously providing at least one premix composition for a concrete mix, which has been measured and prepared by automatic control means according to properties required of the concrete; and kneading and mixing the previously provided premix composition for a concrete mix with cement, coarse aggregate, fine aggregates, water, and a chemical admixture.

Further, according to the present invention, there is provided a standardizing system for concrete production, comprising: measuring constituents of a premix composition for a concrete mix with an automatic control device; mixing these constituents together essentially without through human power to prepare a premix composition for a concrete mix according to properties required of the concrete; and then kneading and mixing this slurry composition of the premix composition with cement, coarse aggregate, fine aggregate, water, and a chemical admixture.

Furthermore, according to the present invention, there is provided a standardizing system for concrete production in a concrete production plant, comprising kneading and mixing the above slurry composition of the premix composition with cement, coarse aggregate, fine aggregate, water and a chemical admixture in the concrete production plant.

Furthermore, according to the present invention, there is provided a standardizing system for concrete production in a concrete production plant, wherein, in the above standardizing system for concrete production, the measurement of the slurry composition of the premix composition comprises adopting either a method in which the slurry composition of the premix composition is previously measured and is then cumulatively measured together with coarse aggregate, or a method in which the slurry composition of the premix composition is directly cumulatively measured together with coarse aggregate.

Furthermore, according to the present invention, there is provided a standardizing system for concrete production in a concrete construction site, comprising kneading and mixing the slurry composition of the premix composition with concrete arrived at the construction site.

EFFECT OF THE INVENTION

The following effects can be attained by the present invention.

Since the individual components constituting concrete can be homogeneously mixed, designed and planned performance requirements can be reliably satisfied.

The admixture is measured, introduced, and kneaded and mixed with an automatic control unit, and, at the same time, introduction timing and introduction order are accurate. Therefore, indefinite factors such as setting of prolongation of kneading and mixing time can be removed.

Whether or not the admixture was mixed, and the mixed amount can be confirmed by printing/recording.

In kneading and mixing powdery admixtures such as expanding materials, rapid hardening materials, high strength admixtures, and waterproof materials, there is no fear of forming lumps and the like which are adhered to a mixer.

The admixture can be measured with high accuracy and can clear measuring error range ±2% of the admixture specified in JIS A 5308 "Ready Mixed Concrete" 8.2.2.

When slurrying is adopted and a measuring bottle for coarse aggregate is used (cumulative measurement of coarse aggregate advance measurement), the kneading and mixing time can be significantly shortened. This can significantly contribute to an increase in production and shipment capacity and a reduction in electric power energy.

The present invention has standardized a production process of concrete which can satisfy a plurality of (multifunctional) performance requirements while fluidizing concrete arrived at the construction site. Here the plurality of (multifunctional) performance requirements refer to, for example, imparting high strength, durability, rapid hardening, waterproofing, rust preventive properties and the like to concrete arrived at the construction site.

BEST MODE FOR CARRYING OUT THE INVENTION

Production Process of Concrete

Figure 1:
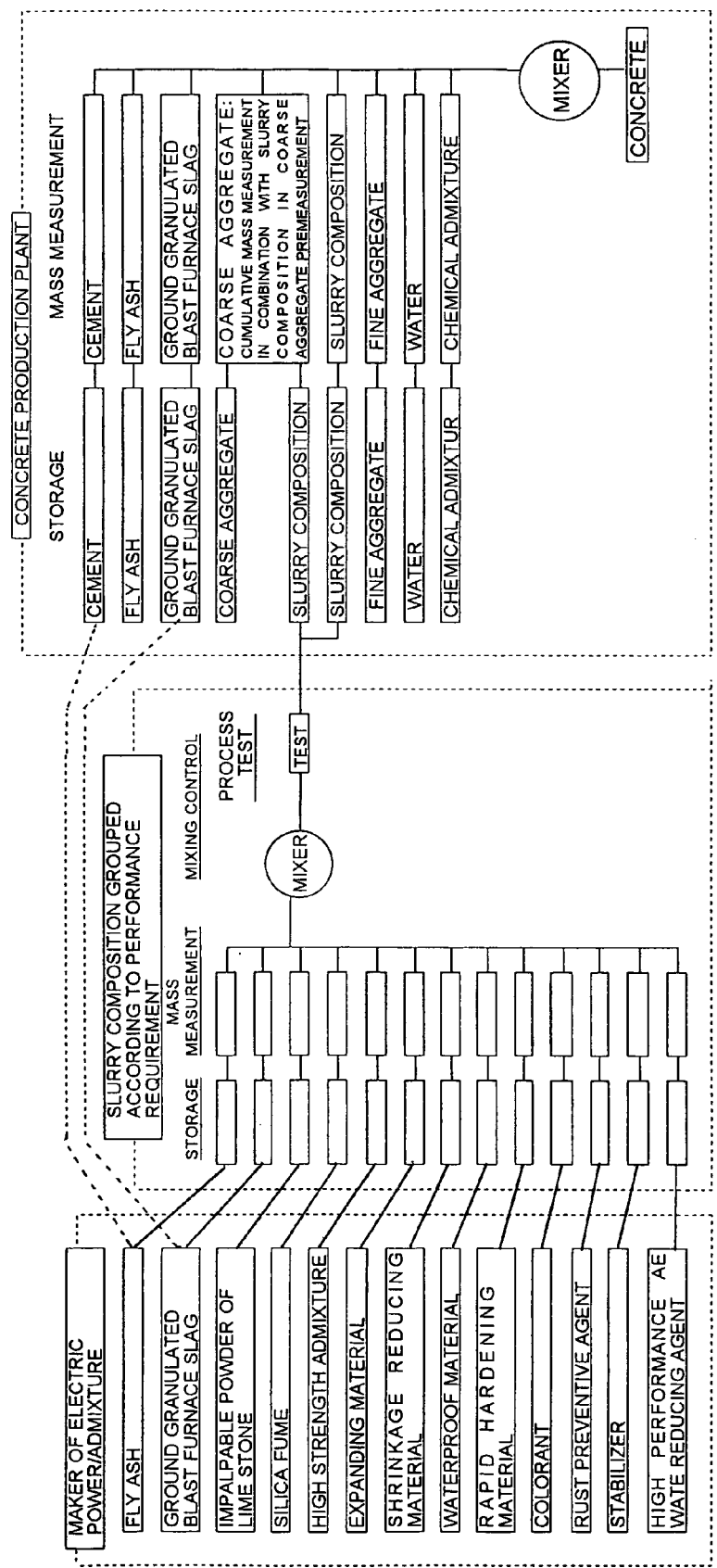
FIG. 1 is a schematic diagram of a standardizing system for concrete production in a concrete production plant according to the present invention.
Figure 2:
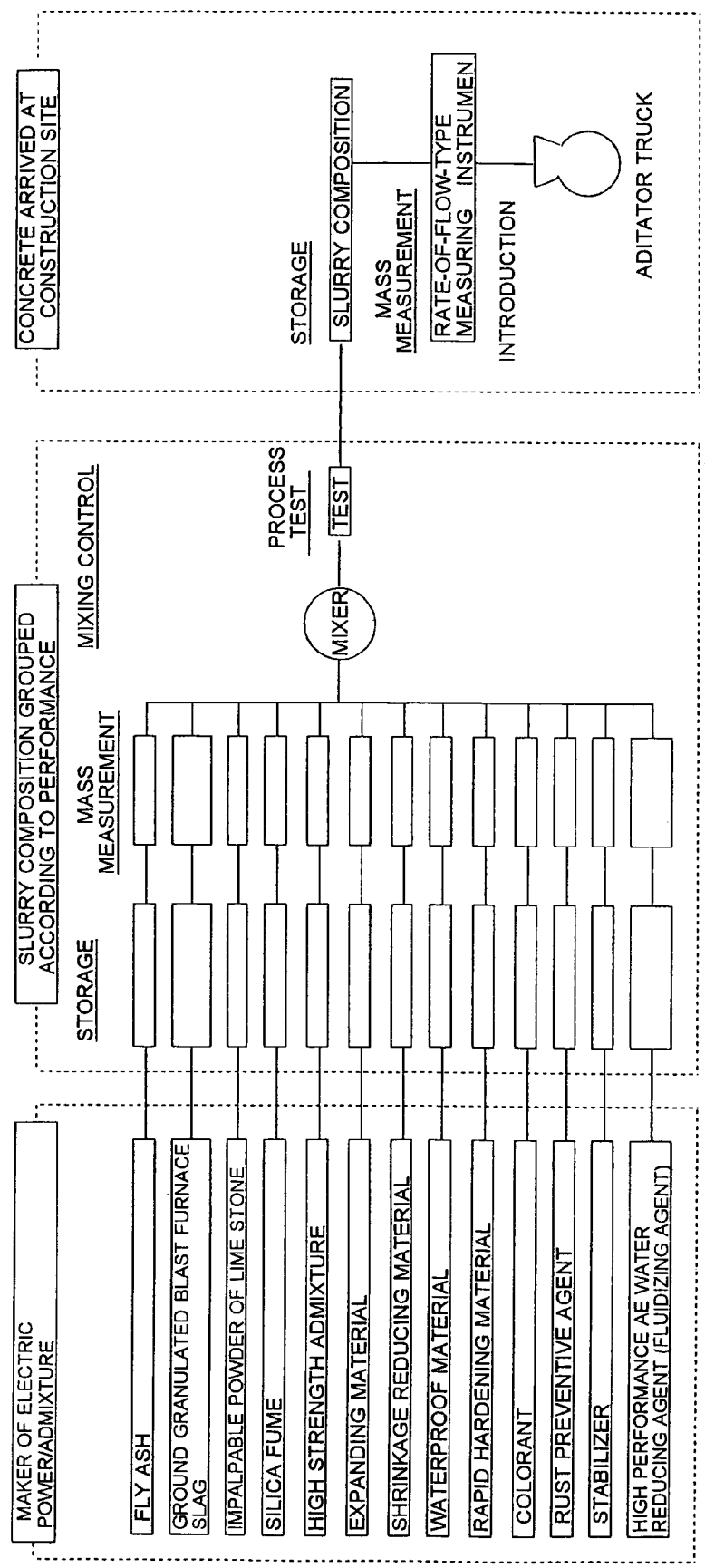
FIG. 2 is a schematic diagram of a standardizing system for concrete production in a concrete construction site according to the present invention.
Figure 3:
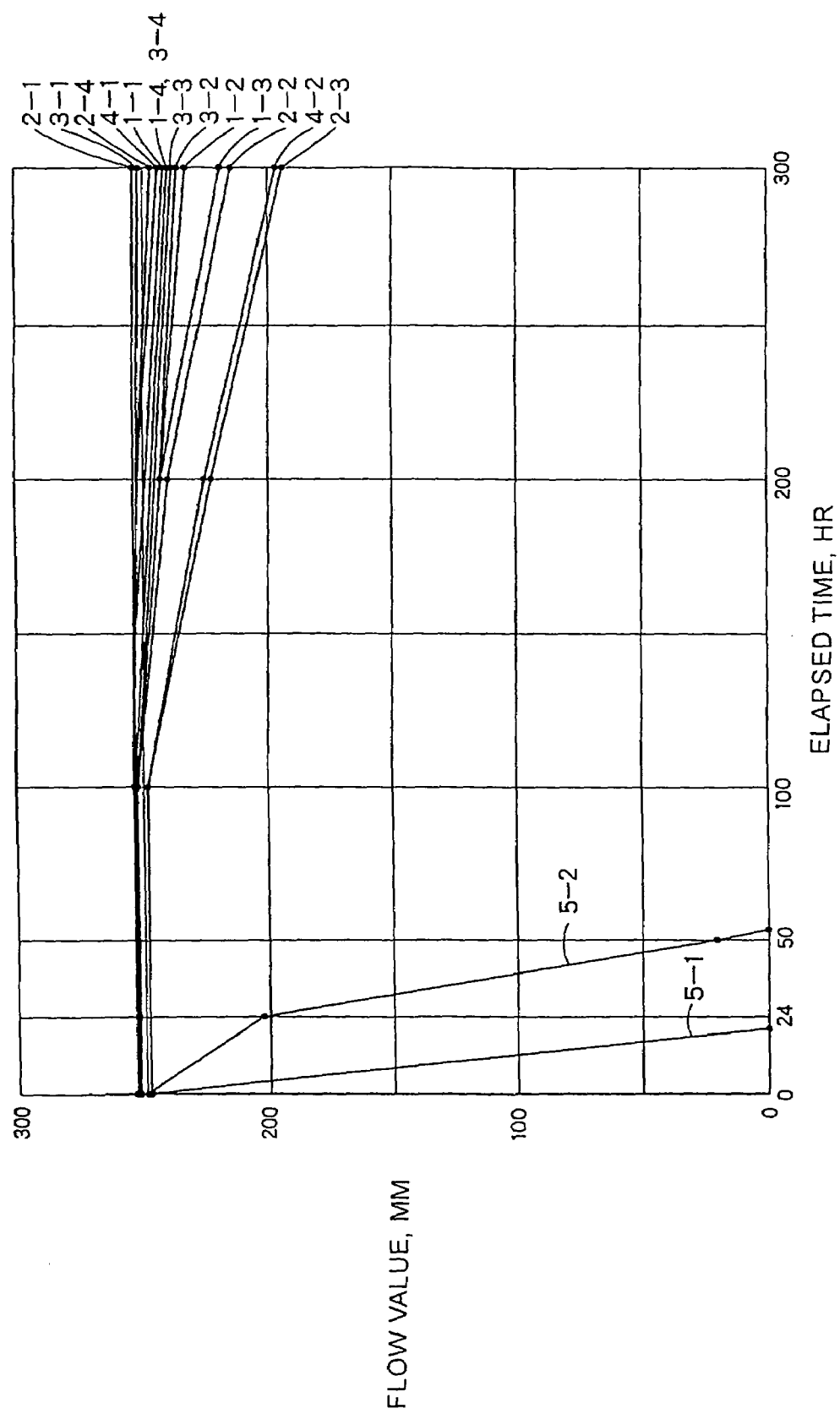
FIG. 3 is a diagram shown in the results of flow tests of premix slurries prepared in Examples of the present invention and Comparative Examples.

The process for producing concrete according to the present invention comprises: in producing concrete, previously providing at least one premix composition for a concrete mix, which has been measured and prepared by automatic control means according to properties required of the concrete; and kneading and mixing the previously provided premix composition for a concrete mix with cement, coarse aggregate, fine aggregates, water, and a chemical admixture.

<Premix Composition for Concrete Mix>

Examples of preferred premix compositions for a concrete mix used in the present invention include a premix composition comprising the following components (A) to (D) and a premix composition comprising the following components (A) to (E):

component (A): 100 parts by weight of at least one admixture (1) selected from the group consisting of fly ash (JIS type II), ground granulated blast furnace slag (JIS 4000), and impalpable powder of lime stone;

component (B): 5 to 2000 parts by weight of at least one admixture (2) selected from silica fume, fly ash (JIS type I), ground granulated blast furnace slag (JIS 8000), and waterproof materials;

component (C): 1 to 20 parts by weight of at least one chemical admixture selected from the group consisting of high performance AE water reducing agents and stabilizers;

component (D): 40 to 160 parts by weight of water; and component (E): 1.5 to 40 parts by weight of at least one admixture (3) selected from the group consisting of expanding materials, shrinkage reducing materials, rapid hardening materials, waterproof materials, and high strength admixtures.

The premix composition for a concrete mix according to the present invention can maintain a good dispersed state of the individual components as achieved, for example, by agitation and, at the same time, can develop predetermined fluidity over a long period of time. A specific example of a preferred premix composition for a concrete mix exhibits such a thixotropic property that, after the elapse of about 120 min in a standing state after agitation, the composition gels and, upon exposure to external force such as agitation or vibration, the gel is brought to slurry. Upon the elapse of time of about 120 min in a standing state after agitation, the composition is brought to gel which exhibit thixotropic properties. Thus, the composition can be shaped into one which conforms to the shape of various vessels. The reason for this is that the particles of the individual components are homogeneously dispersed in water to form a paste substantially free from agglomeration, and the paste can be maintained in this state for a long period of time. Therefore, the gel state can be maintained when a cup containing this paste is inclined at about 90 degrees. On the other hand, upon exposure again to vibration by agitation or the like or the application of weak impulsive force, the gel is converted to a liquid which is again brought to slurry which can be transferred through a pump or the like. Since the gel state can be maintained for about one week or longer, there is no fear that the pump becomes unusable either even when an emergency situation such as a power failure occurs during transfer through a pump or the like, or during holidays in an approximately five-day workweek.

In a preferred premix composition for a concrete mix according to the present invention, different admixtures (1) and (2) are used as the components (A) and (B). The effect of multifunction can be attained by using these few types of admixtures in combination at a predetermined ratio.

<Component (A)>

Component (A) is at least one admixture (1) selected from the group consisting of fly ash (JIS type II), ground granulated blast furnace slag (JIS 4000), and impalpable powder of lime stone.

Fly ash (JIS type II) is fine coal combustion ash collected from flue gas upon combustion of fine coal, for example, in a thermal electric power station or other places, and is classified into type II in JIS (specifically, JIS A 6201 "Fly Ash for Concrete"). The fly ash (JIS type II) contains not less than 45% by weight of silicon dioxide. In the present invention, the content of silicon dioxide is preferably not less than 50% by weight. In the present invention, preferably, the fly ash (JIS type II) comprises 50 to 63% by weight of silicon dioxide, 18 to 35% by weight of aluminum oxide, 2.0 to 7.5% by weight of iron oxide ($Fe_2O_3$), 2.4 to 5.7% by weight of calcium oxide, and 0.4 to 2.1% by weight of magnesium oxide. The quality of the powdery fly ash somewhat varies depending, for example, upon the quality and combustion method of fine coal as a raw material, and fly ash collection equipment. In the present invention, however, fly ash having a specific surface area of not less than 2500 $cm^2/g$, preferably 3000 to 4000 $cm^2/g$, and a density of not less than 1.95 $g/cm^3$, preferably 2.00 to 2.34 $g/cm^3$, is suitable. The particle diameter of the powdery fly ash may be determined by a particle size distribution measuring method using wet sieving (No. 325 retained on sieve) or by X-ray precipitation. The specific surface area of the powdery fly ash may be measured by a Blaine method or a nitrogen gas adsorption method.

Ground granulated blast furnace slag (JIS 4000) refers to one which is obtained by separating and recovering (separated by taking advantage of a difference in specific gravity between pig iron and slag), as blast furnace slag, components other than iron melted in a blast furnace in the production of pig iron, together with limestone as an auxiliary material and ash in coke and is classified in 4000 in JIS (specifically, JIS A 6206 "Ground Granulated Blast Furnace Slag for Use in Concrete"). According to the present invention, a ground granulated blast furnace slag (JIS 4000) having a specific surface area of 3000 to 5000 $cm^2/g$ and a density of not less than 2.8 $g/cm^3$, particularly not less than 2.85 $g/cm^3$, is preferred.

The impalpable powder of lime stone is preferably, for example, one having a Blaine specific surface area of 3000 to 6000 $cm^2/g$ and a density of generally 2.68 to 2.72 $g/cm^3$.

<Component (B)>

Component (B) is at least one admixture (2) selected from silica fume, fly ash (JIS type I), ground granulated blast furnace slag (JIS 8000), and waterproof materials.

The silica fume is generally known also as silica flower, amorphous silica or the like and refers to silicon (Si) and fero silicon (ferrosilicon) (FeSi): silicon iron that is an alloy of iron and silicon which is fragile and has silver white gloss. Industrially, in the production of metallic silicon or ferrosilicon in an electric furnace or the like, silica fume is obtained as a by-product by collecting ultrafine particles of $SiO_2$ (specific surface area as determined by a nitrogen gas adsorption method: 150,000 to 250,000 cm²/g, preferably 190,000 to 200,000 cm²/g) contained in waste gas, for example, by a dust collector.

The particle diameter of silica fume somewhat varies depending, for example, upon the production method and raw material, and silica fume collection equipment. In general, however, the silica fume particles are ultrafine particles having an average particle diameter of 0.004 to 1 μm, preferably 0.05 to 0.5 μm, particularly preferably 0.1 to 0.3 μm. The silica fume has a chemical composition generally comprising generally 63 to 96% by weight, preferably 87 to 94% by weight, of silicon dioxide ($SiO_2$), generally 0.1 to 11% by weight, preferably 0.5 to 2.0% by weight, of iron oxide ($Fe_2O_3$), generally 0.1 to 6% by weight, preferably 0.6 to 1.4% by weight, of aluminum oxide ($Al_2O_3$), generally 0.1 to 3.5% by weight, preferably 0.8 to 2.0% by weight, of carbon (C), generally 0.1 to 2.5% by weight, preferably 0.2 to 0.7% by weight, of sodium oxide ($Na_2O$), and generally 0.1 to 2.5% by weight, preferably 0.4 to 1.0% by weight, of potassium oxide ($K_2O$). The particle diameter of the silica fume may be determined by measuring particle size distribution by a laser light scattering method (microtrack) and determining, as an average particle diameter, d50 corresponding to 50% by weight (see "Cho Bibun Wo Mochiita Kokyodo Semento No Koka To Hakai (Hardening and Fracture of High Strength Cement Using Ultrafines)," Journal of "Semento Konkurito (Cement and Concrete)," No. 495, May, 1988, pp. 20-29). If necessary, the average particle diameter may be measured under a transmission electronmicroscope (TEM).

The fly ash (JIS type I) refers to one which is fine coal combustion ash collected from flue gas in the combustion of fine coal, for example, in a thermal electric power generation plant or other places and is classified in type I in JIS (specifically JIS A 6201). The fly ash (JIS type I) comprises not less than 45% by weight of silicon dioxide. In the present invention, the content of silicon dioxide is preferably not less than 47% by weight. For the powdery fly ash, the quality somewhat depends, for example, upon the quality and combustion method of fine coal as the raw material and fly ash collection equipment. In the present invention, however, preferably, a suitable fine coal has a specific surface area of not less than 5000 m²/g and a density of not less than 1.95 g/cm³, preferably 2.00 to 2.34 g/cm³.

The ground granulated blast furnace slag (JIS 8000) refers to one which is obtained by separating and recovering (separated by taking advantage of a difference in specific gravity between pig iron and slag), as blast furnace slag, components other than iron melted in a blast furnace in the production of pig iron, together with limestone as an auxiliary material and ash in coke and is classified in 8000 in JIS (specifically, JIS A 6206).

The waterproof material preferably has a Blaine specific surface area of 11.5 to 12.5 m²/g and a density of 2.49 to 2.51 g/cm³. An example of the waterproof material is "NN-P," manufactured by TAIHEIYO MATERIALS CORPORATION.

The component (B) is used in a proportion of 5 to 2000 parts by weight, preferably 10 to 500 parts by weight, particularly preferably 20 to 200 parts by weight, based on 100 parts by weight of the component (A). When the proportion of the component (B) is less than 5 parts by weight, the suspension form retaining time is short and, consequently, a separation precipitation phenomenon takes place and, at the same time, there is no fluidity. On the other hand, when the component (B) exceeds 2000 parts by weight, the suspension form retaining time is disadvantageously unstable.

<Component (C)>

The component (C) is at least one chemical admixture selected from the group consisting of high performance AE water reducing agents and stabilizers.

The high performance AE water reducing agents include polycarboxylic acid salt, aminosulfonic acid, naphthalene, melamine and other high performance AE water reducing agents. Among them, polycarbonylic acid salt or aminosulfonic acid high performance AE water reducing agents are preferred. For these high performance AE water reducing agents, specifically, polycarboxylic acid salt high performance AE water reducing agent is commercially available from FLOWRIC Co., Ltd. under the tradename designation "FLOWRIC SF 500 SB." The aminosulfonic acid high performance AE water reducing agent is commercially available from FLOWRIC Co., Ltd. under the tradename designation "FLOWRIC SF 200 SB."

The stabilizer preferably comprises an oxycarboxylic acid. This stabilizer is commercially available from FLOWRIC Co., Ltd. under the tradename designation "SF Clean."

The component (C) is used in a proportion of 1 to 20 parts by weight, preferably 1.2 to 18 parts by weight, particularly preferably 1.5 to 15 parts by weight, based on 100 parts by weight of the component (A). When the high performance AE water reducing agent and the stabilizer are used in combination, the total amount of the high performance AE water reducing agent and the stabilizer falls within the above-defined range.

<Component (D)>

The component (D) is water. Water as the component (D) may be any desired one. Water easily available in a production site of a premix composition for a concrete mix, for example, tap water and groundwater, may be utilized.

The component (D) is preferably used in an amount of 40 to 160 parts by weight based on 100 parts by weight of the composition (A).

<Component (E)>

The component (E) is at least one admixture (3) selected from the group consisting of expanding materials, shrinkage reducing materials, rapid hardening materials, waterproof materials, and high strength admixtures.

Expanding materials include ettringite, lime, and ettringite-lime composite expanding materials. Preferred expanding materials in the present invention include ettringite-lime composite expanding materials, for example, "DENKA POWER CSA," manufactured by Denki Kagaku Kogyo K.K.

The shrinkage reducing material is preferably an alkylene oxide adduct of a lower alcohol represented by $RO(AO)_nH$. In this formula, R represents an alkyl group having 4 to 6 carbon atoms. Examples of such alkyl groups include n-butyl, iso-butyl, tert-butyl, n-pentyl, iso-pentyl, and tert-pentyl groups. A represents an alkylene group having 2 or 3 carbon atoms which may be an ethylene group and/or a propylene group. n in the formula is an integer of 1 to 10. In the present invention, for example, "Hibiguard 500," manufactured by FLOWRIC Co., Ltd. may be utilized.

The rapid hardening material is preferably at least one member selected from nitrous acid salts, thiocyanic acid salts and alkanol (2 to 10 carbon atoms) amines having a high level of rapid hardening properties, particularly nitrous acid salts and thiocyanic acid salts. Preferred nitrous acid salts and thiocyanic acid salts are alkaline earth metals of nitrous acid and thiocyanic acid. Particularly preferred are calcium nitrite and calcium thiocyanate. Preferred alkanolamines include mono-, di- or triethanolamines, and triethanolamine is particularly preferred. For example, "Denka Σ1000" manufactured by Denki Kagaku Kogyo K.K. may be utilized.

Waterproof materials include water glass, calcium, metal soap, siliceous mineral powder, and polymer emulsions. Any one of or a mixture of two or more of them may be used as the waterproof material. For example, "Bestone A" manufactured by Bestone Co., Ltd. may be utilized.

The high strength admixture is preferably composed mainly of anhydrous gypsum. For example, "Denka Σ6000" manufactured by Denki Kagaku Kogyo K.K. may be utilized.

The component (E) is preferably used in an amount of 1.5 to 40 parts by weight based on 100 parts by weight of the composition (A). When a plurality of materials are used in combination as the chemical admixture (2), the total amount of the plurality of materials falls within the above-defined range.

<Production of Premix Composition for Concrete Mix>

The premix composition for a concrete mix according to the present invention may be produced by mixing the components (A) to (D) or the components (A) to (E) together. The components may be mixed by any mixing order and method. Examples of such mixing order and method include (I) one in which all the above components are simultaneously used and compounded and mixed together, (II) one in which to any of the above components is successively added other components one by one, and (III) one in which a mixture of a plurality of components is previously provided and other components or a mixture of other components are added to this mixture.

The components may be mixed by any of (IV) a method in which all the components are loaded into a mixer and are stirred or are brought to a fluid state for mixing of the components, (V) a method in which any one or at least two components are first held in a stirred or fluid state and, in this state, the remaining component(s) is added at a time or continuously or successively for mixing of the components, and (VI) a method in which the mixing procedure is carried out in a plurality of divided times.

In kneading and mixing of the components, if necessary, the rapid hardening material, the colorant, and the rust preventive agent may be kneaded and mixed.

The constituents constituting the premix composition for a concrete mix are measured with automatic control means, and the measured components are mixed together to prepare the above premix composition for a concrete mix. Accordingly, this automatic control means comprises a measuring mechanism for measuring the mass, volume and/or flow rate of the components, a regulation mechanism for regulating the mixing amounts of the components, and an automatic control mechanism for automatically controlling the regulation mechanism depending upon the measurement results obtained by the measuring mechanism.

<Standardizing System for Concrete Production>

The standardizing system for concrete production according to the present invention is characterized by comprising: measuring constituents of a premix composition for a concrete mix with an automatic control device; mixing these constituents together essentially without through human power to prepare a premix composition for a concrete mix depending upon properties required of the concrete; and then kneading and mixing the slurry composition of this premix composition with cement, coarse aggregate, fine aggregate, water, and a chemical admixture.

For example, the above premix composition may be used as the premix composition for a concrete mix according to the present invention.

Examples of cements include normal portland cements, high-early-strength portland cements, blast furnace cements, low-heat portland cements, and moderate-heat portland cements.

Coarse aggregates generally include gravels and crushed stones.

Fine aggregates generally include sands such as pit sands, land sands, crushed sands and lightweight fine aggregates (melacite sands).

As with the case of the component (D) in the premix composition for a concrete mix, water may be any desired one. Water easily available in a production site of concrete, for example, tap water and groundwater, may be utilized.

As described above, the premix composition for a concrete mix according to the present invention has been measured and prepared with the automatic control means according to the properties required of concrete. Therefore, concrete satisfying desired property requirements can be produced easily and stably by kneading and mixing of the premix composition for a concrete mix with other constituents of concrete (for example, cement, coarse aggregate, fine aggregate, water, and chemical admixtures). As described above, the premix composition for a concrete mix according to the present invention preferably has thixotropic properties, that is, is such that, upon exposure to weak impact force, the gel is changed to a liquid, that is, is again brought to a slurry state which thus can be transferred through a pump or the like, and the premix composition can be kept in the gel state for about one week or longer. Accordingly, in mixing the premix composition for a concrete mix with other constituents of concrete, the mixing amount of the premix composition for a concrete mix can be accurately regulated in an easy manner, and, thus, this mixing work can be carried out easily and stably.

<Standardizing System for Concrete Production in Concrete Production Plant>

The standardizing system for concrete in a concrete construction site according to the present invention comprises kneading and mixing the slurry composition of the premix composition with cement, coarse aggregage, fine aggregate, water and a chemical admixture in a concrete production plant.

Further, the standardizing system comprises mixing the constituents together, measuring the mass of a slurry composition of a premix composition for a concrete mix, satisfying desired concrete property requirement, with an automatic control device essentially without through human power, and kneading and mixing the slurry composition with cement, coarse aggregate, water, and a chemical admixture.

The measurement of the slurry composition of the premix composition comprises adopting either a method in which, the slurry composition of the premix composition is previously measured and is then cumulatively measured together with coarse aggregate, or a method in which, when the slurry composition of the premix composition is directly cumulatively measured together with the coarse aggregate, the slurry composition of the premix composition is cumulatively measured in a measuring bottle containing a previously measured coarse aggregate.

According to this preferred standardizing system for concrete production, the quality of concrete can be controlled in a better state, and, at the same time, for example, shortening of the kneading time and, in its turn, a reduction in electric power and an enhancement in production (shipment) capacity can be realized. Thus, the standardizing system for concrete production is advantageous in a technical aspect, as well as from an economical point of view.

<Standardizing System for Concrete Production in Concrete Construction Site>

The standardizing system for concrete production in a concrete construction site according to the present invention comprises kneading and mixing the above slurry composition of the premix composition with concrete arrived at the construction site.

The concrete arrived at a construction site refers to concrete which has been carried in a concrete construction site such as a field of construction work. In general, the properties of the concrete arrived at a construction site is different from the properties of concrete upon production thereof in a concrete production plant or the like depending, for example, upon the elapsed time until the concrete arrives at the construction site, a change in environment such as temperature and humidity.

In the standardizing system for concrete production in a concrete construction site according to the present invention, the premix composition for a concrete mix is measured and prepared with automatic control means according to desired concrete property requirements. Therefore, desired properties required of concrete can be easily and stably imparted to concrete arrived at the construction site by kneading and mixing the slurry composition of the premix composition with concrete arrived at the construction site.

EXAMPLES

The following Examples further illustrate the present invention.

1. Components (a) to (e) of Premix Slurry Composition

<Component (A)>

Fly ash: JIS type II, manufactured by Electric Power Development Co., Ltd.

Ground granulated blast furnace slag 4000: JIS 4000, manufactured by DC CO., LTD.

Impalpable powder of lime stone: manufactured by Yoshizawa Lime Industry CO., LTD., density 2.70 g/cm$^3$, Blaine specific surface area 3500 cm$^2$/g <Component (B)>

Silica fume: JIS A 6207, "MicroSilica" 9400U manufactured by Elkem Materials K.K., density 2.70 g/cm$^3$, Blaine specific surface area 20000 cm$^2$/g Fly ash: JIS I type, manufactured by Shikoku Electric Power Company, Incorporated Ground granulated blast furnace slag 8000: JIS 8000, manufactured by DC CO., LTD.

Waterproof material NN-P: Not specified in JIS and the like and manufactured by TAIHEIYO MATERIALS CORPORATION, density 2.50 g/cm$^3$, Blaine specific surface area 12000 cm$^2$/g <Component (C)>

High performance AE water reducing agent: JIS A 6204 standard type, type I, "FLOWRIC SF 500 SB" manufactured by FLOWRIC Co., Ltd., density 1.06 g/cm$^3$ Stabilizer: Not specified in JIS and the like, "SF Clean" manufactured by FLOWRIC Co., Ltd., density 1.12 g/cm$^3$ <Component (D)>

Water: ground water

<Component (E)>

Expanding material: "DENKA POWER CSA" manufactured by Denki Kagaku Kogyo K.K.

"TAIHEIYO HYPER EXPAN" manufactured by TAIHEIYO MATERIALS CORPORATION, density 3.16 g/cm$^3$, Blaine specific surface area 3450 g/cm$^2$ Shrinkage reducing material: "Hibiguard 500" manufactured by FLOWRIC Co., Ltd., density 0.98 g/cm$^3$ Rapid hardening material: "Denka Σ1000" manufactured by Denki Kagaku Kogyo K.K.

Waterproof material: "Bestone A" manufactured by Bestone Co., Ltd., density 2.64 g/cm$^3$, Blaine specific surface area 3500 cm$^2$/g High strength admixture: "Denka Σ6000" manufactured by Denki Kagaku Kogyo K.K., density 2.70 g/cm$^3$, Blaine specific surface area 6100 cm$^2$/g 2. Mixing Ratio of Premix Slurry Composition The mixing ratio of the premix slurry composition is shown in Table 1.

Mix No. 1-1 is a mix composition the primary purpose of which is to provide high strength and high-durability functions and, at the same time, which has a waterproof function.

Mix Nos. 1-2, 1-3 and 2-2 are mix compositions the primary purpose of which is to provide an alkali silica reaction inhibition function and, at the same time, which have high strength and a high-fluidity function. Mix No. 2-3 is a mix composition having a rapid hardening function.

Mix Nos. 3-1, 3-2 and 3-3 are mix compositions the primary purpose of which is to provide a high-fluidity function and, at the same time, which have high strength and a waterproof function.

Mix Nos. 1-4, 2-4 and 3-4 are mix compositions the primary purpose of which is to provide a waterproof function and, at the same time, which have a durability function.

Mix. No. 4-1 is a mix composition which is a three-component admixture premixed slurry and has durability, waterproof, high-strength, and high-fluidity functions.

TABLE 1

Mixing ratio of constituents of premix slurry composition

| | | Example | | | | | | | |
|---|---|---|---|---|---|---|---|---|---|
| Slurry composition No. | | 1-1 | 1-2 | 1-3 | 1-4 | 2-1 | 2-2 | 2-3 | 2-4 |
| Component (A) | Fly ash, type II | 100 | 100 | 100 | 100 | | | | |
| | Ground granulated blast furnace slag 4000 | | | | | 100 | 100 | 100 | 100 |
| | Impalpable powder of lime stone | | | | | | | | |
| Component (B) | Silica fume | 20 | | | | 20 | | | |
| | Fly ash, type I | | 80 | | | | 104 | | |
| | Ground granulated blast furnace slag 8000 | | | 100 | | | | 100 | |

TABLE 1-continued

Mixing ratio of constituents of premix slurry composition

|  |  |  |  |  |  |  |  |  |  |
|---|---|---|---|---|---|---|---|---|---|
| | Waterproof material NN-P | | | | 80 | | | | 104 |
| Component (C) | High performance AE water reducing agent | 5 | 6 | 6 | 6 | 5 | 6 | 7 | 6 |
| | Stabilizer | 5 | 5 | 5 | 10 | 2 | 5 | 10 | 7 |
| Component (D) | Water | 93 | 122 | 134 | 105 | 70 | 136 | 128 | 119 |
| Component (E) | Expanding material | 20 | | | | | | | |
| | Shrinkage reducing material | | | | | | | | |
| | Rapid hardening material | | | | | | | 20 | |
| | Waterproof material | 20 | | | | | | | |
| | High strength admixture | | 30 | 30 | | | | | |
| Water to powder ratio. % | D/A + B | | | | 58.3 | 58.3 | 58.1 | | 58.3 |
| | D/A + B + E | 58.1 | 58.1 | 58.3 | | | | 58.2 | |
| Properties | Thixotropic property | Developed | Developed | Developed | Developed | Developed | Developed | Developed | Developed |

| | | Example | | | | | | Comparative Example | |
|---|---|---|---|---|---|---|---|---|---|
| Slurry composition No. | | 3-1 | 3-2 | 3-3 | 3-4 | 4-1 | 4-2 | 5-1 | 5-2 |
| Component (A) | Fly ash, type II | | | | | | 100 | 100 | 100 | 100 |
| | Ground granulated blast furnace slag 4000 | | | | | 100 | | | |
| | Impalpable powder of lime stone | 100 | 100 | 100 | 100 | | | | |
| Component (B) | Silica fume | 20 | | | | 40 | 20 | | 20 |
| | Fly ash, type I | | 100 | | | | | | |
| | Ground granulated blast furnace slag 8000 | | | 100 | | | | | |
| | Waterproof material NN-P | | | | 100 | | | 80 | |
| Component (C) | High performance AE water reducing agent | 5 | 6 | 6 | 6 | 10 | 7 | 6 | 5 |
| | Stabilizer | — | 2 | 5 | 3 | 6 | 15 | — | — |
| Component (D) | Water | 81 | 146 | 146 | 117 | 140 | 117 | 105 | 93 |
| Component (E) | Expanding material | | | | | | 20 | | 20 |
| | Shrinkage reducing material | | | | | | 10 | | |
| | Rapid hardening material | | | | | | — | | |
| | Waterproof material | 20 | 20 | 20 | | | 20 | | 20 |
| | High strength admixture | | 30 | 30 | | | 30 | | |
| Water to powder ratio. % | D/A + B | | | | 58.5 | 58.3 | | 58.3 | |
| | D/A + B + E | 57.9 | 58.4 | 58.4 | | | 58.5 | | 58.1 |
| Properties | Thixotropic property | Developed | Developed | Developed | Developed | Developed | Developed | Developed | Developed |

Unit: parts by weight

Table 2 shows an example of a combination of properties required of concrete and slurry mix components with slurry mix components.

TABLE 2

Combination of properties required of concrete with slurry mix components

| | | | Chemical admixture | | | Chemical admixture (3) | |
|---|---|---|---|---|---|---|---|
| Ex. | Admixture (1) | Admixture (2) | High performance AE water reducing agent | Stabilizer | Performance requirements | Expanding material | Shrinkage reducing material |
| 1-1 | Fly ash, type II | Silica fume | ○ | ○ | High strength, High fluidity | ○ | ○ |
| 1-2 | | Fly ash, type I | ○ | ○ | Alkali silica reaction inhibitor | ○ | ○ |

TABLE 2-continued

Combination of properties required of concrete with slurry mix components

| Ex. | | | | | | | |
|---|---|---|---|---|---|---|---|
| 1-3 | | Ground granulated blast furnace slag 8000 | ○ | ○ | Alkali silica reaction inhibitor | ○ ○ | ○ ○ |
| 1-4 | | Waterproof material NN-P | ○ | ○ | water-proofing | ○ | ○ |
| 2-1 | Ground granulated blast furnace slag 4000 | Silica fume | ○ | ○ | High strength | ○ | ○ |
| 2-2 | | Fly ash, type I | ○ | ○ | Alkali silica reaction inhibitor | ○ | ○ |
| 2-3 | | Ground granulated blast furnace slag 8000 | ○ | ○ | Alkali silica reaction inhibitor | ○ | ○ |
| 2-4 | | Waterproof material NN-P | ○ | ○ | Water-proofing | ○ | ○ |
| 3-1 | Impalpable powder of lime stone | Silica fume | ○ | ○ | High strength, High fuldity | ○ | ○ |
| 3-2 | | Fly ash, type I | ○ | ○ | High fluidity | ○ | ○ |
| 3-3 | | Ground granulated blast furnace slag 8000 | ○ | ○ | High fluidity | ○ | ○ |
| 3-4 | | Waterproof material NN-P | ○ | ○ | Water-proofing | ○ | ○ |
| 4 | Fly ash, type II Ground granulated blast furnace slag 4000 | Silica fume | ○ | ○ | Ternary system | ○ | ○ |

| | Chemical admixture (3) | | | |
|---|---|---|---|---|
| Ex. | Rapid hardening material | High strength admixture | Water-proof material | Performance requirements |
| 1-1 | ○ | ○ | ○ | High strength, high fluidity, rapid hardening, water-proofing, durability |
| 1-2 | ○ | ○ | ○ | Alkali silica reaction inhibitor, high strength, rapid hardening, water-proofing, durability |
| 1-3 | ○ ○ | ○ ○ | ○ ○ | Alkali silica reaction inhibitor, high strength, rapid hardening, water-proofing, durability |
| 1-4 | ○ | ○ | — | High strength, rapid hardening, water-proofing, durability |
| 2-1 | ○ | ○ | ○ | High strength, rapid hardening, water-proofing, durability |
| 2-2 | ○ | ○ | ○ | Alkali silica reaction inhibitor, high strength, rapid hardening, water-proofing, durability |
| 2-3 | ○ | ○ | ○ | Alkali silica reaction inhibitor, high strength, rapid hardening, water-proofing, durability |
| 2-4 | ○ | ○ | — | High strength, rapid hardening, water-proofing, durability |
| 3-1 | ○ | ○ | ○ | High strength, high fluidity, rapid hardening, water-proofing, durability |
| 3-2 | ○ | ○ | ○ | High strength, high fluidity, rapid hardening, water-proofing, durability |
| 3-3 | ○ | ○ | ○ | High strength, high fluidity, rapid hardening, water-proofing, durability |
| 3-4 | — | ○ | — | High strength, high fluidity, rapid hardening, water-proofing, durability |
| 4 | ○ | ○ | ○ | Ternary system, high strength, high fluidity, rapid hardening, water-proofing, durability |

3. Kneading and Mixing of Premix Slurry Composition

Kneading and mixing of the premix slurry composition were carried out according to JIS R 5201 8.3.1(1)(b) using a hand mixing bowl and a spoon as specified in a hand mixing tool specified in 8.1(3) of JIS R 5201 (Testing method for properties of cement).

4. Evaluation Method (Flow Test of Premix Slurry Composition)

The premix slurry composition was subjected to a flow test by the method specified in II. "Flow test" in JIS R 5201 (Testing method for properties of cement). The results are shown in Table 3 below and FIG. 1.

TABLE 3

Results of premix slurry flow test

| | Elapsed time | | | | |
|---|---|---|---|---|---|
| | 0 hr | 25 hr | 50 hr | 100 hr | 200 hr | 300 hr |
| 1-1 | 250 | 250 | 250 | 250 | 249 | 242 |
| 1-2 | 249 | 249 | 249 | 249 | 242 | 233 |
| 1-3 | 249 | 249 | 249 | 249 | 242 | 218 |
| 1-4 | 249 | 249 | 249 | 249 | 245 | 240 |
| 2-1 | 252 | 252 | 252 | 250 | 250 | 250 |
| 2-2 | 250 | 250 | 250 | 249 | 240 | 215 |
| 2-3 | 248 | 248 | 248 | 248 | 222 | 192 |
| 2-4 | 250 | 250 | 250 | 249 | 247 | 245 |
| 3-1 | 252 | 252 | 252 | 250 | 250 | 248 |
| 3-2 | 249 | 249 | 249 | 248 | 242 | 237 |
| 3-3 | 250 | 250 | 249 | 249 | 243 | 238 |
| 3-4 | 252 | 252 | 252 | 250 | 245 | 240 |
| 4-1 | 250 | 250 | 250 | 249 | 247 | 245 |
| 4-2 | 249 | 249 | 249 | 249 | 225 | 197 |
| 5-1 | 249 | 0 (24 hr) | — | — | — | — |
| 5-2 | 250 | 203 | 0 | — | — | — |

Flow value: in mm

The invention claimed is:

1. A process for producing concrete, comprising:
   in producing concrete, previously providing at least one premix composition for a concrete mix, which has been measured and prepared by automatic control means according to properties required of the concrete; and kneading and mixing the previously provided premix composition to form a slurry composition of the premix composition for a concrete mix with cement, coarse aggregate, fine aggregates, water, and a chemical admixture, wherein the premix composition comprises the following components (A) to (D):
   component (A): 100 parts by weight of at least one admixture (1) selected from the group consisting of fly ash defined as JIS type II, ground granulated blast furnace slag defined as JIS 4000, and impalpable powder of lime stone;
   component (B): 5 to 2000 parts by weight of at least one admixture (2) selected from silica fume, fly ash defined as JIS type I, ground granulated blast furnace slag defined as JIS 8000, and waterproof materials;
   component (C): 1 to 20 parts by weight of at least one chemical admixture selected from the group consisting of high performance AE water reducing agents, and stabilizers; and
   component (D): 40 to 160 parts by weight of water.

2. The process according to claim 1, component (E), wherein component (E) is 1.5 to 40 parts by weight of at least one admixture (3) selected from the group consisting of expanding materials, shrinkage reducing materials, rapid hardening materials, waterproof materials, and high strength admixtures.

3. The process according to claim 1, wherein the premix composition for a concrete mix has thixotropic properties.

4. A method of standardizing concrete production, comprising:
   measuring each component of a premix composition for a concrete mix with an automatic control device; mixing these components together essentially without through human power to prepare a premix composition for a concrete mix according to properties required of the concrete; storing the premix composition; measuring the mass of a slurry composition of the premix composition with an automatic control device essentially without through human power; and kneading and mixing the slurry of the premix composition with cement, coarse aggregate, fine aggregate, water, and a chemical admixture, wherein the premix composition comprises the following components (A) to (D):
   component (A): 100 parts by weight of at least one admixture (1) selected from the group consisting of fly ash defined as JIS type II, ground granulated blast furnace slag defined as JIS 4000, and impalpable powder of lime stone;
   component (B): 5 to 2000 parts by weight of at least one admixture (2) selected from silica fume, fly ash defined as JIS type I, ground granulated blast furnace slag defined as JIS 8000, and waterproof materials;
   component (C): 1 to 20 parts by weight of at least one chemical admixture selected from the group consisting of high performance AE water reducing agents, and stabilizers;
   and component (D): 40 to 160 parts by weight of water.

5. The method according to claim 4, wherein the measurement of the premix composition comprises adopting either a method in which the slurry composition of the premix composition is previously measured and is then cumulatively measured together with coarse aggregate, or a method in which, when the slurry composition of the premix composition is directly cumulatively measured together with the coarse aggregate, the slurry composition of the premix composition is cumulatively measured in a measuring bottle containing a previously measured coarse aggregate.

6. A method of standardizing concrete production, comprising:
   measuring each component of a premix composition for a concrete mix with an automatic control device; mixing the components together essentially without through human power to prepare the premix composition for a concrete mix according to properties required of the concrete; storing the premix composition with an automatic control device essentially without through human power; and kneading and mixing a slurry of the premix composition with concrete arrived at a construction site, wherein
   the premix composition for the concrete mix comprises the following components (A) to (D):
   component (A): 100 parts by weight of at least one admixture (1) selected from the group consisting of fly ash defined as JIS type II, ground granulated blast furnace slag defined as JIS 4000, and impalpable powder of lime stone;

component (B): 5 to 2000 parts by weight of at least one admixture (2) selected from silica fume, fly ash defined as JIS type I, ground granulated blast furnace slag defined as JIS 8000, and waterproof materials;

component (C): 1 to 20 parts by weight of at least one chemical admixture selected from the group consisting of high performance AE water reducing agents, and stabilizers; and component (D): 40 to 160 parts by weight of water.

* * * * *